United States Patent
Hill

(10) Patent No.: US 11,021,143 B2
(45) Date of Patent: Jun. 1, 2021

(54) APPARATUS, SYSTEM, AND METHOD FOR USE IN BRAKE CALIPER INSPECTION

(71) Applicant: Honda Motor Co., Ltd., Tokyo (JP)

(72) Inventor: Robert Lee Hill, Odenville, AL (US)

(73) Assignee: HONDA MOTOR CO., LTD., Tokyo (JP)

( * ) Notice: Subject to any disclaimer, the term of this patent is extended or adjusted under 35 U.S.C. 154(b) by 352 days.

(21) Appl. No.: 16/048,617

(22) Filed: Jul. 30, 2018

(65) Prior Publication Data

US 2020/0031328 A1 Jan. 30, 2020

(51) Int. Cl.
*B60T 17/22* (2006.01)

(52) U.S. Cl.
CPC ................... *B60T 17/221* (2013.01)

(58) Field of Classification Search
CPC .... B60T 17/221; B60T 17/222; B60T 17/043; G01N 29/227; G01N 29/223
See application file for complete search history.

(56) References Cited

U.S. PATENT DOCUMENTS

| | | | |
|---|---|---|---|
| 5,964,326 A | 10/1999 | Lee et al. | |
| 6,206,055 B1 | 3/2001 | Hollub et al. | |
| 6,269,682 B1 * | 8/2001 | Vaughn | G01L 5/28 701/19 |
| 6,305,228 B1 * | 10/2001 | Kimura | B66C 1/0212 73/749 |
| 6,626,036 B2 | 9/2003 | Milender et al. | |
| 8,615,349 B2 | 12/2013 | Neelakantan et al. | |
| 8,936,053 B2 | 1/2015 | Ogerly et al. | |
| 2007/0029875 A1 * | 2/2007 | Kurosaki | B60T 8/1764 303/187 |
| 2013/0276217 A1 * | 10/2013 | Patil | A62B 17/006 2/456 |
| 2015/0068851 A1 * | 3/2015 | Switzer | F16D 65/28 188/1.11 E |
| 2016/0297413 A1 | 10/2016 | Alford | |
| 2017/0021895 A1 * | 1/2017 | Yasukawa | B60T 8/1706 |

* cited by examiner

*Primary Examiner* — Suman K Nath

(74) *Attorney, Agent, or Firm* — Armstrong Teasdale LLP

(57) ABSTRACT

A brake caliper inspection apparatus that includes a housing including an interior and a plurality of ports that provide access to the interior. The apparatus also includes a plurality of components each coupled to a port of the plurality of ports. The plurality of components includes a sensor configured to monitor a gauge pressure within said interior, a nozzle configured to channel fluid therethrough, and a viewing dome configured to provide a visual indication of an air-to-fluid ratio within said interior.

19 Claims, 5 Drawing Sheets

APPARATUS, SYSTEM, AND METHOD FOR USE IN BRAKE CALIPER INSPECTION

BACKGROUND

The field of the present disclosure relates generally to fluid systems in a vehicle and, more specifically, to systems and methods of inspecting a brake system in a vehicle during a filling operation.

A known process step in the manufacture of motor vehicles includes adding fluids to hydraulic, cooling, and lubricating systems of the vehicle. For example, fluids must be added to the engine, transmission, steering system, cooling system, and brake system of the vehicle to enable the vehicle to operate properly. Vehicle fluid filling operations may be performed with an automated or robotic filling tool, which facilitates filling the various systems with the proper amount of fluid in a rapid and repeatable manner. In at least some known filling operations, such as those in which brake fluid is introduced into the brake system, air must be removed from the brake system before brake fluid is introduced therein to facilitate improving the responsiveness of the brakes in the vehicle. However, if malfunctions occur during the air removal or fluid filling cycles, it may be difficult to determine the source of the malfunctions.

BRIEF DESCRIPTION

In one aspect, a brake caliper inspection apparatus is provided. The apparatus includes a housing including an interior and a plurality of ports that provide access to the interior. The apparatus also includes a plurality of components each coupled to a port of the plurality of ports. The plurality of components includes a sensor configured to monitor a gauge pressure within said interior, a nozzle configured to channel fluid therethrough, and a viewing dome configured to provide a visual indication of an air-to-fluid ratio within said interior.

In another aspect, a brake caliper inspection system is provided. The system includes a plurality of brake caliper inspection apparatuses each configured to be coupled in flow communication with a brake caliper in a vehicle. Each apparatus includes a housing including an interior and a plurality of ports that provide access to the interior. The apparatus also includes a plurality of components each coupled to a port of the plurality of ports. The plurality of components includes a sensor configured to monitor a gauge pressure within said interior, a nozzle configured to channel fluid therethrough, and a viewing dome configured to provide a visual indication of an air-to-fluid ratio within said interior. The system also includes a monitoring unit in communication with the sensor of each brake caliper inspection apparatus. The monitoring unit is configured to monitor the gauge pressure within the interior of each brake caliper inspection apparatus.

In yet another aspect, a method of inspecting a brake system in a vehicle is provided. The method includes coupling a brake caliper inspection apparatus in flow communication with each brake caliper in the vehicle, pressurizing the brake system with a filling apparatus, and monitoring a gauge pressure within each brake caliper with the brake caliper inspection apparatus.

DETAILED DESCRIPTION

The embodiments described herein relate generally to systems and methods of inspecting a brake system in a vehicle during a filling operation. More specifically, the system described herein includes a plurality of brake caliper inspection apparatuses that are each selectively coupled in flow communication with a brake caliper in the vehicle. During an inspection operation, a brake fluid filling apparatus mates with a fluid reservoir of the vehicle and performs a fluid filling operation. During normal fluid filling operations, typically a vacuum cycle is performed to remove air from the brake fluid system, and a filling cycle is then performed to fill the brake fluid system with a predetermined volume of fluid. The brake caliper inspection apparatuses verify that the filling apparatus is functioning properly. For example, the brake caliper inspection apparatuses provide independently verifiable pressure readings for each brake caliper that may then be cross-referenced to pressure readings obtained by a sensor associated with the filling apparatus. The brake caliper inspection apparatuses are also capable of determining an amount of air in the brake calipers after the filling cycle is complete. As such, the brake caliper inspection apparatuses enable an operator to determine if the filling apparatus is functioning within normal parameters and, as a result, enable the operator to determine if the cause of an abnormal fluid filling operation is in the vehicle itself.

Figure 1:
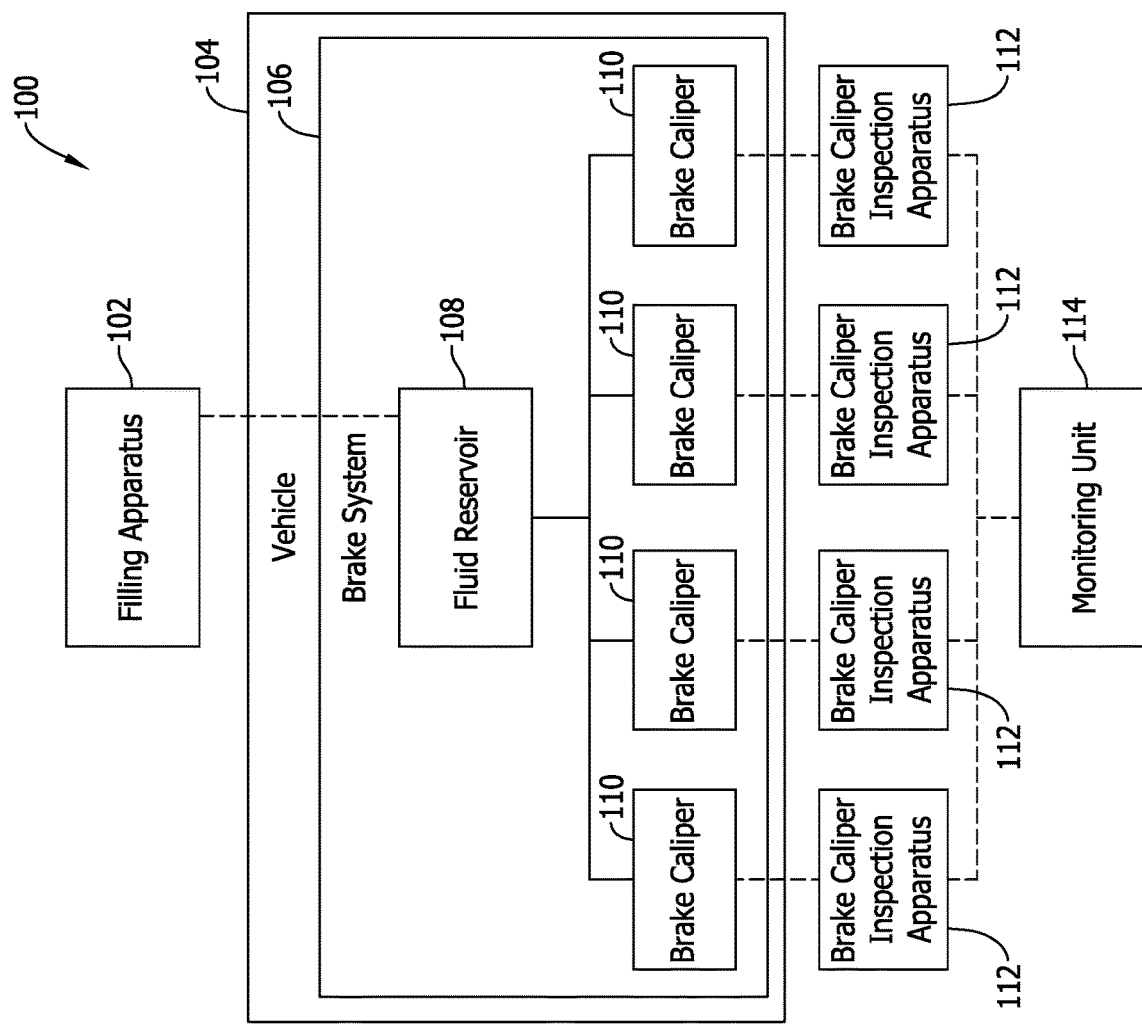
FIG. 1 is a box diagram illustrating an exemplary brake caliper inspection system.

FIG. 1 is a box diagram illustrating an exemplary brake caliper inspection system 100. In the exemplary embodiment, a filling apparatus 102 is used to perform a fluid filling operation on a vehicle 104, such as to fill a brake system 106 of vehicle 104 with brake fluid. Brake system 106 includes a fluid reservoir 108 and a plurality of brake calipers 110 in flow communication with fluid reservoir 108. In operation, filling apparatus 102 mates with fluid reservoir 108 with an air tight interface and then pressurizes brake system 106 by performing a vacuum cycle and then performing a fluid filling cycle. The vacuum cycle facilitates removing air from brake system 106 before brake fluid is injected therein.

Brake caliper inspection system 100 also includes a plurality of brake caliper inspection apparatuses 112 each configured to be coupled in selective flow communication with one of brake calipers 110 in vehicle 104. In one embodiment, brake caliper inspection apparatus 112 is coupled in flow communication with brake caliper 110 at a bleeder screw connection point in a brake caliper (not shown) of brake system 106. A monitoring unit 114 is in communication with each brake caliper inspection apparatus 112, as will be explained in more detail below. Remote monitoring unit 114 enables an operator to monitor a gauge pressure within each brake caliper inspection apparatus 112 from a central and convenient location. Remote monitoring unit 114 may be any computerized or digital device that enables brake caliper inspection system 100 to function as described herein.

In FIG. 1, solid lines, if any, connecting various elements and/or components may represent mechanical, electrical, fluid, optical, electromagnetic and other couplings and/or combinations thereof. Dashed lines, if any, connecting the various elements and/or components represent couplings similar in function and purpose to those represented by solid lines; however, couplings represented by the dashed lines may either be selectively provided or may relate to alternative or optional examples of the present disclosure.

Figure 2:
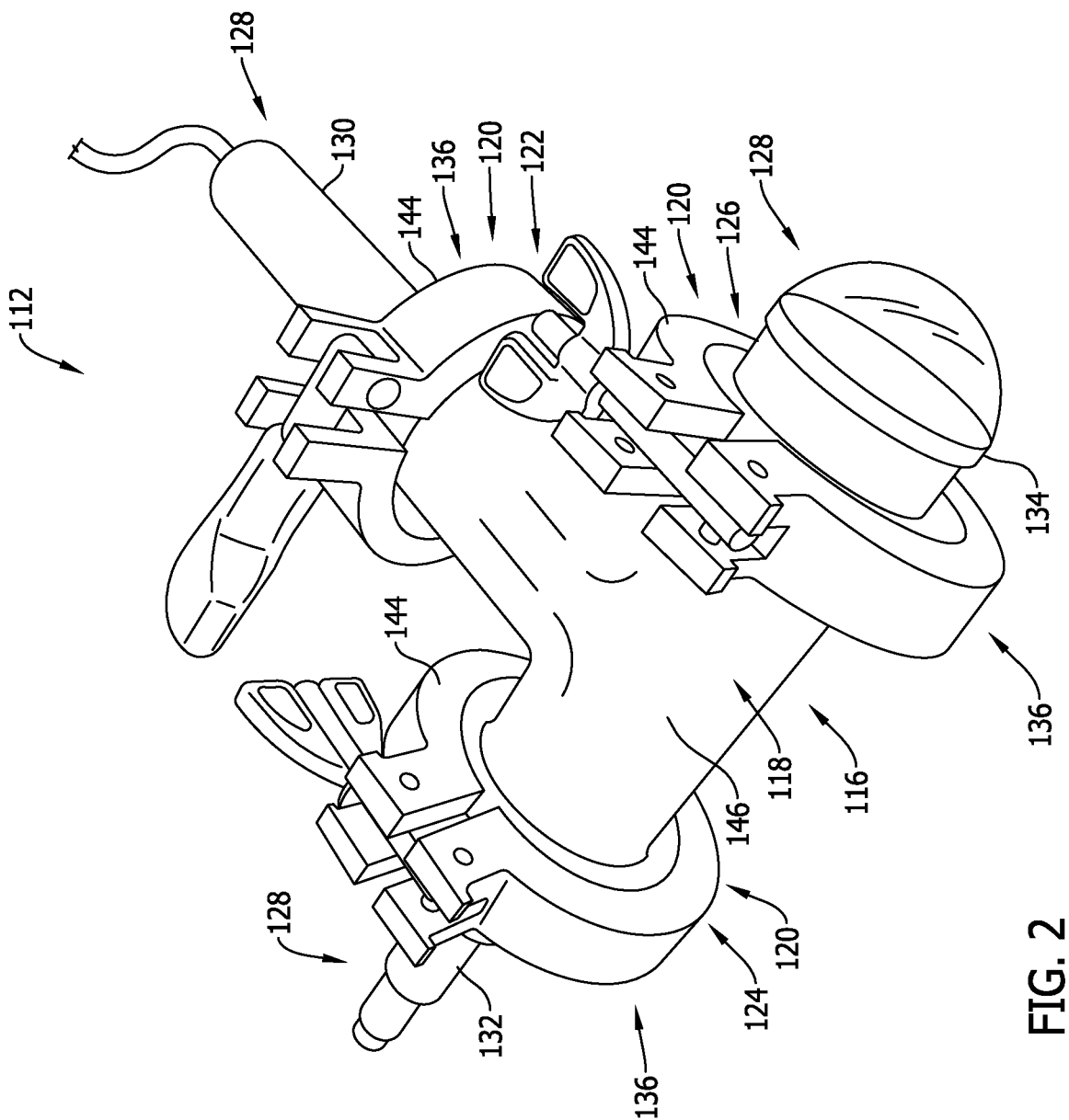
FIG. 2 is a perspective view of an exemplary brake caliper inspection apparatus.
Figure 3:
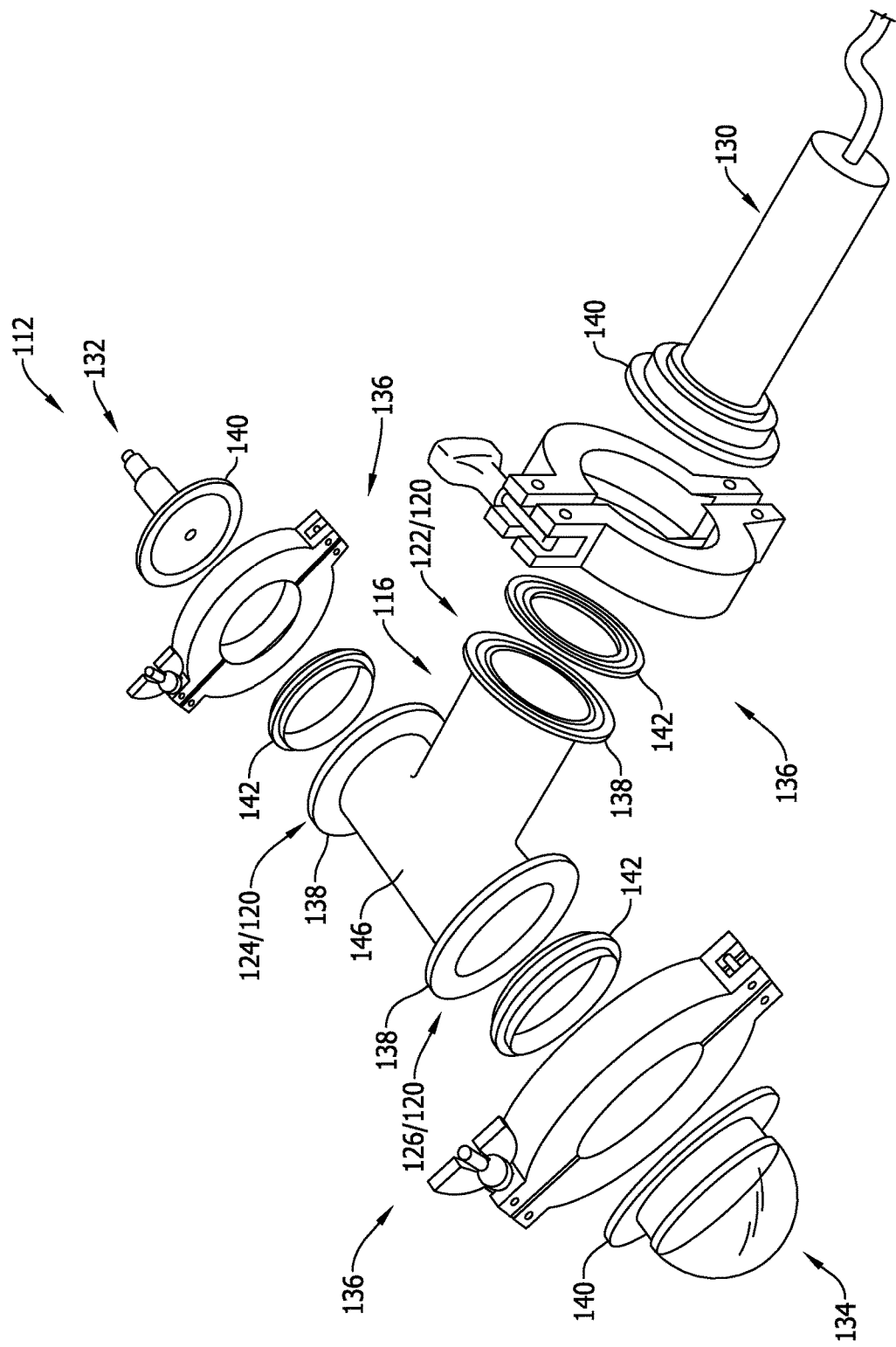
FIG. 3 is an exploded perspective view of the brake caliper inspection apparatus shown in FIG. 2.

FIG. 2 is a perspective view of an exemplary brake caliper inspection apparatus 112, and FIG. 3 is an exploded perspective view of brake caliper inspection apparatus 112. In the exemplary embodiment, brake caliper inspection apparatus 112 includes a housing 116 that includes an interior 118 and a plurality of ports 120 that provide selective access to interior 118. The plurality of ports 120 include a first port 122, a second port 124, and a third port 126. Housing 116 has a T-shaped design, which enables first port 122, second port 124, and third port 126 to be defined at discrete ends of housing 116. Alternatively, housing 116 may be formed in any other shape that enables brake caliper inspection apparatus 112 to function as described herein.

Brake caliper inspection apparatus 112 further includes a plurality of components 128 each coupled to a different port 120. The plurality of components 128 includes a sensor 130, a nozzle 132, and a viewing dome 134. In addition, the plurality of components 128 are removably coupled to the plurality of ports 120. For example, sensor 130 is removably coupled to first port 122, nozzle 132 is removably coupled to second port 124, and viewing dome 134 is removably coupled to third port 126. In one embodiment, the plurality of components 128 are removably coupled to the plurality of ports 120 with a vacuum flange 136.

For example, referring to FIG. 3, housing 116 includes flanged side walls 138 at the plurality of ports 120. In addition, the plurality of components 128 each include a complementary flanged side wall 140 that is shaped to mate with one of flanged side walls 138 of housing 116. Each vacuum flange 136 includes a seal member 142 positioned between housing 116 at each port 120 and each of the plurality of components 128. Each vacuum flange 136 also includes a clamp 144 used to secure seal members 142 between housing 116 and each of the plurality of components 128. More specifically, seal member 142 is positioned between flanged side walls 138 of housing and flanged side walls 140 of each component 128, and clamp 144 encapsulates flanged side walls 138, flanged side walls 140, and seal members 142 at each respective port 120. Seal members 142 are formed at least partially from elastomeric material to facilitate sealing the plurality of ports 120 with an air tight interface.

In the exemplary embodiment, sensor 130 is any device capable of monitoring a pressure within interior 118 of housing 116. In one embodiment, sensor 130 is a transducer capable of monitoring a positive gauge pressure and a negative gauge pressure within interior 118. As such, as will be explained in more detail below, sensor 130 is capable of monitoring the gauge pressure within brake caliper 110 of vehicle 104 during the performance of both a vacuum cycle and a filling cycle by a brake fluid filling apparatus 102 (all shown in FIG. 1).

In the exemplary embodiment, housing 116 includes at least one side wall 146 that is capable of withstanding deformation when interior 118 is pressurized during the vacuum cycle and the fill cycle. For example, side wall 146 is configured to withstand deformation when an absolute gauge pressure value within interior 118 is less than a predetermined value. As such, side wall 146 withstands deformation to facilitate ensuring the accuracy of pressure readings obtained by sensor 130 during the vacuum and fill cycles.

Figure 4:
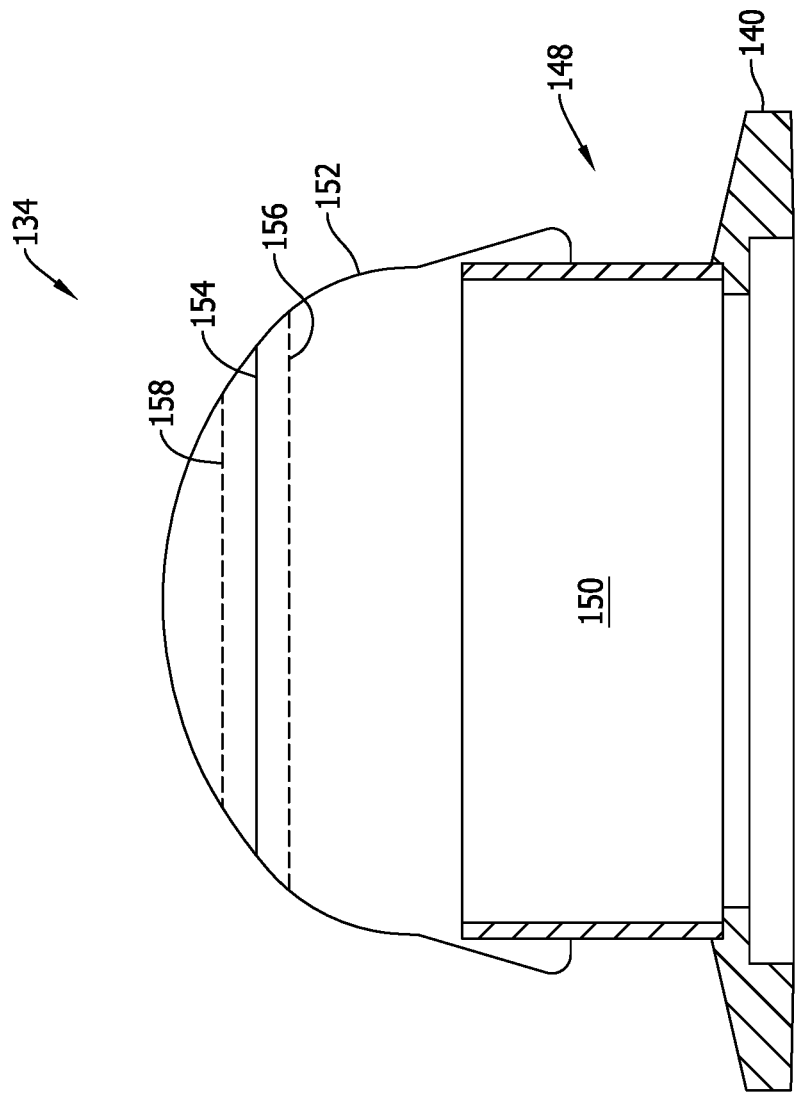
FIG. 4 is a cross-sectional illustration of an exemplary viewing dome that may be used in the brake caliper inspection apparatus shown in FIG. 2.

FIG. 4 is a cross-sectional illustration of viewing dome 134. In the exemplary embodiment, viewing dome 134 includes a housing 148 having an interior 150 and flanged side wall 140. A transparent dome 152 is coupled to housing 116, which provides an operator with view into interior 118 from exterior of viewing dome 134. As such, viewing dome 134 provides a visual indication of an air-to-fluid ratio within interior 118 after a fluid filling operation has been completed by filling apparatus 102 (shown in FIG. 1). For example, not all air may be removed from brake system 106 (shown in FIG. 1) after completion of a fluid filling operation. Thus, transparent dome 152 has a circular marking 154 thereon, which defines a threshold for the air-to-fluid ratio when viewing dome 134 is in a predetermined orientation.

For example, when brake system 106 is filled with a predetermined volume of fluid and not all air has been removed therefrom, an air bubble (not shown) is viewable in viewing dome 134 when oriented vertically (e.g., when the viewing dome is oriented such that the air bubble is concentrically aligned with circular marking 154). In the exemplary embodiment, if an air bubble is viewable at a first fill line 156 below circular marking 154 when viewing dome 134 is oriented correctly (e.g., vertically), then viewing dome 134 provides an indication that an excess amount of air is within that particular brake caliper 110 (shown in FIG. 1). In contrast, if the air bubble is viewable at a second fill line 158 above circular marking 154 when viewing dome 134 is oriented correctly, then viewing dome 134 provides an indication that the amount of air within that particular brake caliper 110 is at an acceptable level. The acceptable level of the amount of air is determined as a function of the responsiveness of brake system 106.

Figure 5:
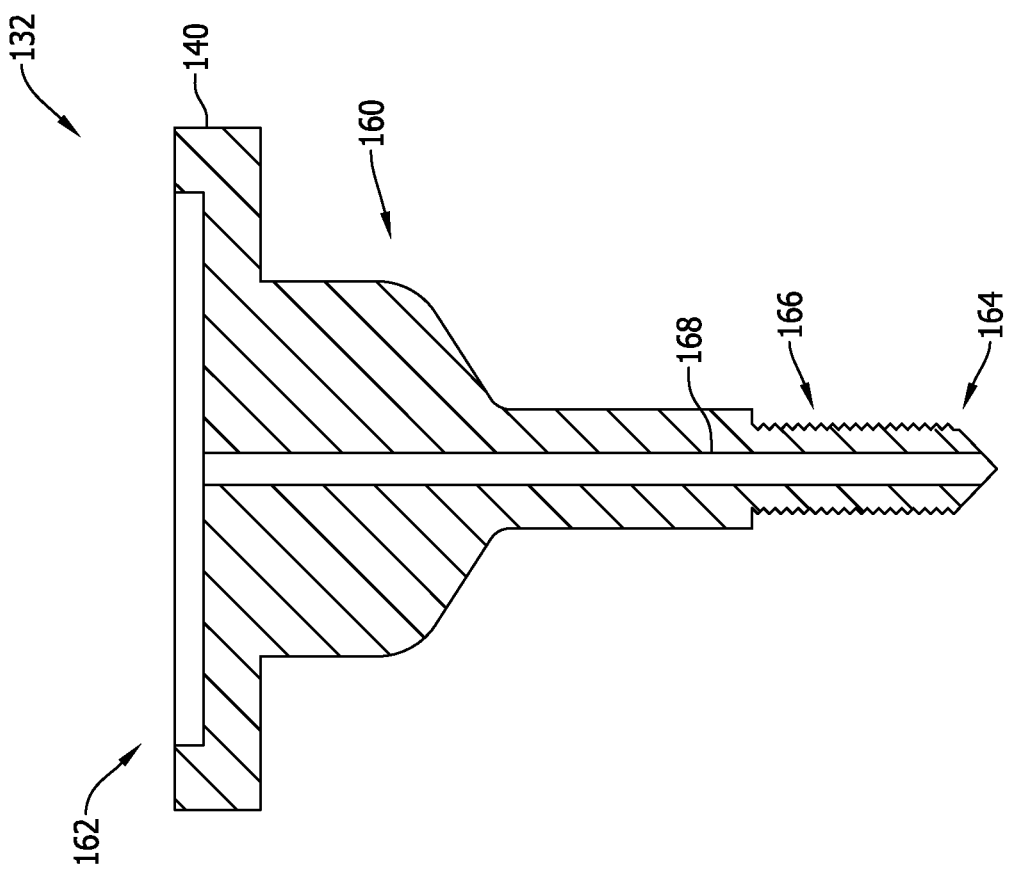
FIG. 5 is a cross-sectional illustration of an exemplary nozzle that may be used in the brake caliper inspection apparatus shown in FIG. 2.

FIG. 5 is a cross-sectional illustration of nozzle 132. In the exemplary embodiment, nozzle 132 includes a housing 160 having a first end 162 for coupling to housing 116 of brake caliper inspection apparatus 112 (both shown in FIG. 2), and a second end 164. Flanged side wall 140 is formed at first end 162, and nozzle 132 includes a threaded attachment feature 166 formed at second end 164. Threaded attachment feature 166 enables nozzle to be coupled at a bleeder screw connection point in a brake caliper of brake system 106, as described above. In addition, nozzle 132 includes an interior passage 168 extending longitudinally therethrough. As such, nozzle 132 is configured to coupling to one of brake calipers 110 in vehicle 104 (both shown in FIG. 1) such that fluid is capable of being channeled into and out of interior 118 (shown in FIG. 3) of housing 116 through interior passage 168.

Referring again to FIG. 1, in operation, a brake caliper inspection apparatus 112 is coupled in flow communication with each brake caliper 110 in vehicle 104, and filling apparatus 102 pressurizes brake system 106 by performing a fluid filling operation. The fluid filling operation includes performance of a vacuum cycle followed by performance of a fill cycle in which brake system 106 is filled with a predetermined volume of fluid. Sensor 130 (shown in FIG. 2) of brake caliper inspection apparatus 112 monitors a gauge pressure within each brake caliper 110 during both the vacuum cycle and the filling cycle. Sensor 130 monitors the gauge pressure to determine if the pressure reaches a predetermined threshold after the vacuum cycle or the filling cycle is complete. If the gauge pressure does not reach the predetermined threshold, it may be an indication that one or more components of brake system 106 have malfunctioned or are damaged.

In some embodiments, filling apparatus 102 performs the vacuum cycle and then holds brake system 106 under seal and at a negative pressure for a predetermined duration before performing the fill cycle. Sensor 130 continues to monitor the gauge pressure within interior 108 over the predetermined duration, and facilitates determining variations in the gauge pressure. Variations in the gauge pressure (e.g., a decrease in an absolute gauge pressure value) over the predetermined duration may provide an indication that one or more components of brake system 106 have malfunctioned and/or are leaking This written description uses examples to disclose various embodiments, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A brake caliper inspection apparatus comprising:
   a housing comprising:
      an interior; and
      a plurality of ports that provide access to said interior; and
   a plurality of components each coupled to a respective port of said plurality of ports, said plurality of components comprising:
      a sensor configured to monitor a gauge pressure within said interior;
      a nozzle configured to channel fluid, including at least one of air or liquid, into and out of said interior; and
      a viewing dome that is transparent to provide a view into said interior such that an air-to-liquid ratio is determinable based on the presence or size of an air bubble within said interior and visible at said viewing dome.

2. The apparatus in accordance with claim 1, wherein said plurality of components are removably coupled to said plurality of ports.

3. The apparatus in accordance with claim 1, wherein said housing comprises flanged side walls at said plurality of ports, said plurality of components each comprising a flanged side wall configured to mate with one of said flanged side walls of said housing.

4. The apparatus in accordance with claim 3 further comprising:
   a seal member positioned between said housing and each of said plurality of components; and
   a clamp configured to secure said seal member between said housing and each of said plurality of components.

5. The apparatus in accordance with claim 1, wherein said nozzle comprises a first end coupled to said housing, and a second end having a threaded attachment feature.

6. The apparatus in accordance with claim 1, wherein said viewing dome comprises a marking configured to define a visual threshold for the air bubble that is viewable within said interior when said viewing dome is in a predetermined orientation.

7. The apparatus in accordance with claim 1, wherein said sensor is configured to monitor a positive gauge pressure and a negative gauge pressure within said interior.

8. A brake caliper inspection system comprising:
   a plurality of brake caliper inspection apparatuses each configured to be coupled in flow communication with a brake caliper in a vehicle, wherein each brake caliper inspection apparatus comprises:
      a housing comprising:
         an interior; and
         a plurality of ports that provide access to said interior;
      a plurality of components each coupled to a respective port of said plurality of ports, said plurality of components comprising:
         a sensor configured to monitor a gauge pressure within said interior;
         a nozzle configured to channel fluid, including at least one of air or liquid, into and out of said interior; and
         a viewing dome that is transparent to provide a view into said interior such that an air-to-liquid ratio is determinable based on the presence or size of an air bubble within said interior and visible at said viewing dome; and
   a monitoring unit in communication with said sensor of each brake caliper inspection apparatus, said monitoring unit configured to monitor the gauge pressure within said interior of each brake caliper inspection apparatus.

9. The system in accordance with claim 8, wherein said plurality of components are removably coupled to said plurality of ports.

10. The system in accordance with claim 8, wherein said housing comprises flanged side walls at said plurality of ports, said plurality of components each comprising a flanged side wall configured to mate with one of said flanged side walls of said housing.

11. The system in accordance with claim 10 further comprising:
    a seal member positioned between said housing and each of said plurality of components; and
    a clamp configured to secure said seal member between said housing and each of said plurality of components.

12. The system in accordance with claim 8, wherein said nozzle comprises a first end coupled to said housing, and a second end having a threaded attachment feature.

13. The system in accordance with claim 8, wherein said viewing dome comprises a circular marking configured to define a threshold for the air-to-liquid ratio when said viewing dome is in a predetermined orientation.

14. The system in accordance with claim 8, wherein said sensor is configured to monitor a positive gauge pressure and a negative gauge pressure within said interior.

15. A method of inspecting a brake system in a vehicle, the brake system including a plurality of brake calipers, said method comprising:
    coupling a respective brake caliper inspection apparatus in flow communication with each brake caliper in the vehicle, wherein the brake caliper inspection apparatus includes an interior and a viewing dome configured to provide a visual indication of an air-to-liquid ratio within the interior;
    pressurizing the brake system with a filling apparatus, wherein the pressurizing comprises filling the brake system with a predetermined volume of liquid;

monitoring a gauge pressure within said each brake caliper with the respective brake caliper inspection apparatus;

orienting at least one of the respective brake caliper inspection apparatuses such that an air bubble within the interior is viewable in the viewing dome; and determining a volume of air in each brake caliper based on a size of the air bubble in the viewing dome.

16. The method in accordance with claim 15 further comprising holding the brake system under seal for a predetermined duration, wherein monitoring the gauge pressure comprises determining variations in the gauge pressure over the predetermined duration.

17. The method in accordance with claim 15, wherein pressurizing the brake system comprises using the filling apparatus to pressurize the brake system over one of a filling cycle or a vacuum cycle, wherein monitoring a gauge pressure comprises determining if the gauge pressure within the brake system reaches a predetermined threshold after the filling cycle or the vacuum cycle is complete.

18. The method in accordance with claim 15, wherein pressurizing the brake system comprises forming a vacuum within the brake system.

19. The method in accordance with claim 18, wherein pressurizing the brake system comprises filling the brake system with a predetermined volume of fluid after the vacuum is formed.

\* \* \* \* \*